US011853686B2

(12) United States Patent
Corfield et al.

(10) Patent No.: US 11,853,686 B2
(45) Date of Patent: Dec. 26, 2023

(54) RECOGNITION OF ARTIFACTS IN COMPUTER DISPLAYS

(71) Applicant: nVoq Incorporated, Boulder, CO (US)

(72) Inventors: Charles N. Corfield, Boulder, CO (US); Stephen L. Bulick, Boulder, CO (US); E. Peter Fox, Boulder, CO (US); Adam M. Ornstein, Boulder, CO (US); Derek C. Smith, Boulder, CO (US)

(73) Assignee: nVoq Incorporated, Boulder, CO (US)

( * ) Notice: Subject to any disclaimer, the term of this patent is extended or adjusted under 35 U.S.C. 154(b) by 0 days.

(21) Appl. No.: 17/059,894

(22) PCT Filed: May 24, 2019

(86) PCT No.: PCT/US2019/033869
§ 371 (c)(1),
(2) Date: Nov. 30, 2020

(87) PCT Pub. No.: WO2019/236322
PCT Pub. Date: Dec. 12, 2019

(65) Prior Publication Data
US 2021/0124971 A1 Apr. 29, 2021

Related U.S. Application Data

(60) Provisional application No. 62/680,153, filed on Jun. 4, 2018.

(51) Int. Cl.
*G06F 40/166* (2020.01)
*G06F 40/174* (2020.01)
(Continued)

(52) U.S. Cl.
CPC .......... *G06F 40/166* (2020.01); *G06F 3/0482* (2013.01); *G06F 40/174* (2020.01); *G06V 30/153* (2022.01)

(58) Field of Classification Search
CPC .... G06V 30/153; G06V 30/10; G06F 3/0482; G06F 40/174; G06F 40/166
See application file for complete search history.

(56) References Cited

U.S. PATENT DOCUMENTS 6,895,556 B1 * 5/2005 Kaply ..................... G06F 21/10
715/741
8,774,536 B1 * 7/2014 Jia .......................... G06V 10/95
382/232

(Continued)

OTHER PUBLICATIONS

International Search Report and Written Opinion dated Oct. 4, 2019 for International Application No. PCT/US2019/33869.

*Primary Examiner* — Keith D Bloomquist
(74) *Attorney, Agent, or Firm* — Perkins Coie LLP

(57) ABSTRACT

A digital display of an active window is provided. An application, separate from the application providing the digital display, is capable of identifying an artifact in the active window of the digital display without a priori knowledge or an application programming interface to the application providing the digital display. The artifacts may be alpha-numeric artifacts or non-alpha-numeric artifacts. The active window may be examined in multiple dimensions including 2 dimensions, 3 dimensions or more. Alphanumeric artifacts, once identified, are pre-processed to remove anti-aliasing to allow for processor optical recognition.

20 Claims, 6 Drawing Sheets

(51) Int. Cl.
  *G06F 3/0482* (2013.01)
  *G06V 30/148* (2022.01)

(56) References Cited

U.S. PATENT DOCUMENTS

| | | | | |
|---|---|---|---|---|
| 11,682,368 | B1* | 6/2023 | Lopez Mendez | G06F 1/3212 345/698 |
| 2006/0017752 | A1* | 1/2006 | Kurzweil | G06V 30/166 345/698 |
| 2007/0168382 | A1 | 7/2007 | Tillberg et al. | |
| 2008/0317347 | A1* | 12/2008 | Lim | G06T 7/0002 382/182 |
| 2010/0138775 | A1* | 6/2010 | Kohen | G06F 11/3041 715/781 |
| 2010/0259541 | A1* | 10/2010 | Kitago | G06T 17/20 345/423 |
| 2014/0258838 | A1* | 9/2014 | Evers | G06F 40/174 715/234 |
| 2017/0060368 | A1* | 3/2017 | Kochura | G06F 9/451 |
| 2017/0108938 | A1 | 4/2017 | Forest | |
| 2019/0213046 | A1* | 7/2019 | Matus | G06F 9/5044 |
| 2020/0310522 | A1* | 10/2020 | Cueva | G06F 1/266 |

* cited by examiner

RECOGNITION OF ARTIFACTS IN COMPUTER DISPLAYS

CROSS-REFERENCE TO RELATED PATENT APPLICATIONS

The present application is a U.S. National Stage application of International PCT Application No. PCT/US2019/033869, filed May 24, 2019, which claims priority to U.S. Provisional Patent Application Ser. No. 62/680,153, filed Jun. 4, 2018, the entirety of which is incorporated herein by reference.

BACKGROUND

Graphical displays are ubiquitous today. Many commercial industries use, at some level, processors that display information to users of the information, whether the user is an employee or customer. One exemplary type of user interface display may include a customer relationship management (CRM) application; another type of display may include an informational dashboard; still another type of display may be close caption. The processors, whether remote for a thin workstation or local for a thick workstation, provide displays of information from numerous sources processed through one or more applications that, for simplicity, are referred to as a first application herein.

The displayed information or artifacts, typically alpha-numeric but sometimes images and fields, are processed for human/user consumption. The display, whether a computer screen, a television screen, or other type of monitor, is provided with rows and columns of pixels. Each pixel is typically a rectangular shape. The displayed information, for example, the text of this application displayed on a monitor, is processed to smooth out the text or graphics for human consumption to make it easier for people to read. The technique to process the displayed information for people is generally known in the industry as anti-aliasing. The anti-aliasing techniques damp the pixilation of the display.

Frequently, data/information processed by a first application that is displayed on a monitor is used by one or more other applications separate from the first application, which is referred to for simplicity as a second, separate application. The first application v. the second, separate application is simply to distinguish that the application providing the display is different from the application attempting to access information in the display. The second, separate application may need the data/information from the first application to further process the data/information, which may subsequently be displayed or processed. Conventionally, the second, separate application can obtain the data/information directly from the first application if the first application provides an application programming interface, which is generally referred to in the industry as an API. Without the API, a user must interact with the processor to transfer data/information from the first application to the second, separate application. For example, a CRM, which may be a first application, may display information to an agent on an agent workstation. The CRM may display, among other things, a customer account. It is not unusual to need to import the customer account to another application, which may be a second, separate application. However, the CRM may not provide an API. Thus, the second application can only obtain the customer account number by having an agent either type the account number into the second, separate application, which may, for example, be an invoicing application, or the agent can copy and paste the account number from the CRM to the second, separate application. Of course, this is but one example, and should not be considered limiting.

Also, a display, such as a user interface (UI), may have artifacts, which may include alpha-numeric data/information, but also other data/information such as radio buttons, check boxes, data entry fields or the like that need to be manipulated. Currently, people generally interact with the UIs to click radio buttons, check check boxes, or type alpha-numeric information into data entry fields to describe just three examples. Currently, it is not possible for a processor without a priori information of the UI to locate and click radio buttons, check fields, or post data into data entry fields.

Against this background, it would be desirous to provide a process for the second, separate application to obtain the data/information displayed on a monitor, or an identified region of the monitor.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In one objective of the technology, a processor processes data in a digital display to identify artifacts. The artifacts may be alpha-numeric and non-alpha-numeric artifacts. The processor processes data and identifies artifacts without a priori knowledge of the digital display. In another objective of the technology, a processor recognizes characters on a digital display without a priori knowledge of the character (s). In still other objectives, the processor performs some action related to the identified artifact, be it an alpha-numeric artifact or a non-alpha-numeric artifact.

In one aspect, a method of recognizing a non-alpha-numeric artifact on a digitized display is provided. The process includes defining a perimeter of a region on a digitized display for a processor and identifying, by the processor, a boundary of at least one non-alpha-numeric artifact within the region on the digitized display. Once the boundary is identified, the shape of the boundary is determined and compared to a target shape and saved to a potential candidate artifact list if the boundary has the correct target shape. Next, the non-alpha-numeric artifact shape is determined to have a geometric relationship to the potential candidate artifact list. If the geometric relationship does not exist, the potential candidate is removed from the list. Next (or at substantially the same time or before), alpha-numeric artifacts are linked to the potential candidate artifacts in the list and the alpha-numeric artifact is recognized to label the non-alpha-numeric artifact.

In certain aspects, the non-alpha-numeric artifact is a radio button, a check box, a data entry field, a 3-dimensional artifact, or the like. Embodiments of the technology may further manipulate the non-alpha-numeric artifact, such as, for example, marking a check box or activating a radio button, entering data, selecting an item from a menu of items, or the like.

In another aspect, a method of recognizing alpha-numeric artifacts on a digitized display is provided. The method includes, among other things, identifying, by the processor, at least one candidate region on the digitized display as having alpha-numeric artifacts and processing the at least one candidate region on the digitized display to enhance the boundaries of the alpha-numeric artifacts. The processing includes scaling the at least one candidate region and removing anti-aliasing from the alpha-numeric such that the processor can recognize the non-anti-aliased alpha-numeric artifacts to recognize at least one alpha-numeric character. The non-anti-aliased alpha-numeric artifact may be recognized using optical character recognition.

In certain aspects, the recognized alpha-numeric artifact may be copied, pasted, used by a different artifact or application, or further processed.

In certain aspects, a method of identifying data in an artifact is provided.

In another aspect, a method performed on at least one processor of identifying data in an artifact is provided. The method includes identifying an artifact of associated with a digital display and determining an initial state of the identified artifact at a beginning of a period of time, where the initial state of the identified artifact comprises initial data. Next, the artifact is monitored for the period of time and a determination is made whether the initial state of the identified artifact changes, such as, for example, by data entry, movement of an item past a threshold, or the like. When it is determined that the initial state of the identified artifact has changed, a new steady state of the artifact is identified wherein the artifact comprises changed data and the changed data is processed. The changed data may be the same or different than the initial data. The processing of the changed data may include copying the changed data. The artifact being monitored may comprise a radio button, a data entry field, a character, a check box, list of items, a scrolling menu, an audio, or a combination thereof.

In certain aspects the step of identifying a steady state may comprise monitoring the artifact to determine when changes to the artifact are complete or have ceased. In certain aspects, the artifact is sampled (a.k.a. new sample) and compared to a previous sample. If the new sample is the same as the previous sample, it may be determined that the artifact is at a new steady state. In certain aspects, the previous sample may be a null set.

These and other aspects of the present system and method will be apparent after consideration of the Detailed Description and Figures herein.

BRIEF DESCRIPTION OF THE DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

The technology of the present application will now be described more fully below with reference to the accompanying figures, which form a part hereof and show, by way of illustration, specific exemplary embodiments. These embodiments are disclosed in sufficient detail to enable those skilled in the art to practice the technology of the present application. However, embodiments may be implemented in many different forms and should not be construed as being limited to the embodiments set forth herein. The following detailed description is, therefore, not to be taken in a limiting sense.

The technology of the present application is described with specific reference to a first application displaying artifacts on a monitor where a second, separate application can recognize the artifacts, without advance knowledge of the artifacts, displayed on the monitor, including such items as buttons, menus, scrolling lists, labels, boxes, data fields, etc. The recognition may be without the benefit of an application programming interface. The artifacts may be non-alpha-numeric artifacts or alpha-numeric artifacts (such as labels for one example). The technology described herein relates, in part, to recognizing a type of artifact and a label associated with the artifact. The technology described herein also relates to recognizing text (or alpha-numeric data) in a display. However, the technology described herein may be used for recognizing other artifacts displayed on the monitor. In certain aspects, the technology will identify radio buttons on a display. In other aspects, the technology will recognize check boxes and associate text boxes with certain related information. In yet other aspects, the technology will provide scripts to take one or more actions based on recognized data (text, radio buttons, check boxes, etc). Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

The technology described herein relates to identifying text, radio buttons, check boxes, labels or other user interface items on a display, which may generically be referred to as artifacts or user interface (UI) data without a program knowing, a priori, whether the artifact is, in fact, included in the display and/or where the artifact is located in the display if the artifact is included in the display. The technology described herein also provides for associating artifacts together, such as, for example, a radio button and a textual label associated with the radio button.

Figure 1:
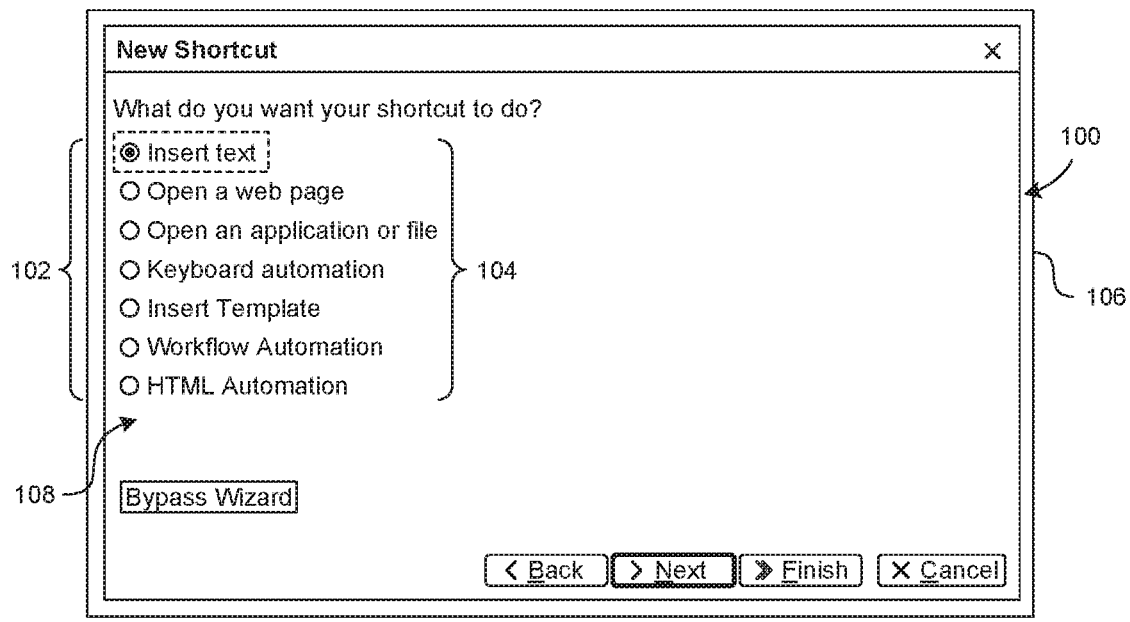
FIG. 1 is an interface display consistent with the technology of the present application.

FIG. 1 shows an exemplary, albeit simple, user interface (UI) 100 consistent with the technology of the present application. The UI 100 includes a number of radio buttons 102 (which are one type of non-alpha-numeric artifact) and labels 104 (which are one type of alpha-numeric artifact) associated with the radio buttons 102. The UI 100 is provided on a display 106 of a monitor by a first application A, which may be located with the monitor (a.k.a. a thick client) or may be remote from the monitor (a.k.a. a thin client). The UI 100, which may be considered an active window, may be a portion of the overall display 106. In some instances, the active window is the entire display. As can be appreciated, a person looking at the UI 100 understands that the radio button 102 has a label 104 immediately to the right of the radio button 102. However, for present purposes, the UI 100 is provided by a first application A. A second, separate application B requires data/information from the UI 100, but the first application A does not provide an accessible API. Moreover, the second, separate application B does not have a priori knowledge of the contents of the UI 100 nor the layout of UI 100. In other words, the second, separate application B does not know in advance that the first application A has a UI 100 with radio buttons 102 arranged in a column on the left portion 108 of the UI 100 with labels 104 closely associated but to the right of the radio buttons 102.

The second, separate application B may provide a script to click on the radio button 102 with the label 104 "open a web page". However, second, separate application B has no information whether the UI 100 has radio buttons 102 let alone a radio button labeled "open a web page". As can be appreciated in FIG. 1, the UI 100, which is a dialog box in this example, may be provided with a default selection or not. In this case, the radio button 102 with the label 104 "insert text" is the default selection. First, the second, separate application would identify the perimeter of the UI 100, which may be, for example, the pixel coordinates for the scope of the window for UI 100. The pixel coordinates may be manually provided by a user/operator or obtained from the operating system managing the windows on the display. Typically, the operating systems provide an API that the second, separate application B can access to identify window dimensions as well as other data about the window, such as, for example, the window label (or title). The operating system does not have information about the contents of the active window, at least in this exemplary embodiment. Using the API from the operating system, the second, separate application B may locate the UI 100 provided by the first application A, but second, separate application B may access the technology described herein to identify information about the contents of the window. In certain embodiments, the second, separate application B may be directed to a window with a particular label. The second, separate application B may interrogate the operating system to find the window and extract the coordinates from using the API. The second, separate application B would associate the outline or perimeter of the UI 100 as the boundary to look for the radio button 102 with the label 104 "open a web page", but the second, separate application B would not know, at this time, whether the UI 100 provided by the first application A, in fact, had the radio button or label. In certain instances, the second, separate application B would search all windows contained within the display 106 (or multiple displays 106). In some instances, the second, separate application B may search the entire display, which may include multiple monitors and may include non-active windows or other background programs.

Figure 2:
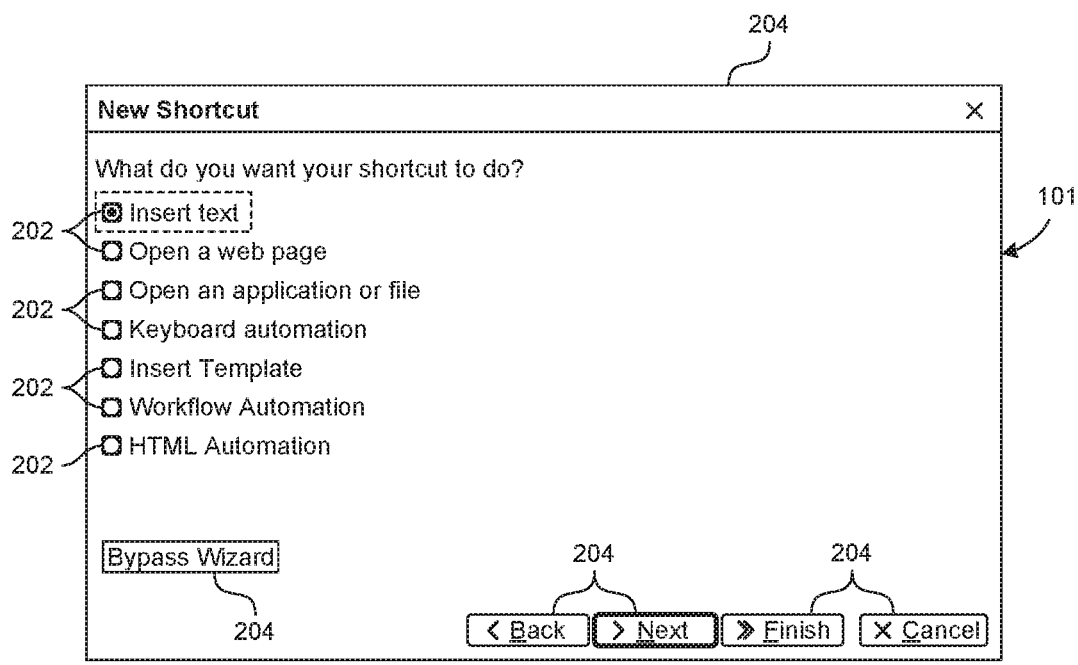
FIG. 2 is a modified version of the interface display of FIG. 1 consistent with the technology of the present application where non-alpha-numeric artifacts in the interface display have been identified.

Next, the operation would begin converting the UI 100 into a version where the data/information is more readily deducible by the processor running the operation for second, separate application B. As mentioned above, the UI 100 is provided for people to read, which is difficult for a computer to read without a priori knowledge of the UI 100. Thus, the operation next converts the UI 100 to a grayscale UI 101 image as shown in FIG. 2 (FIG. 2 shows the grayscale conversion and a Laplacian operation on the image). The grayscale processing can be completed by the processor running the operation. In the alternative, the greyscale conversion of the UI 100 can be accomplished by a call to the OpenCV library, which is an Open Source Computer Vision Library.

Once the grayscale UI 101 is obtained, an edge detection operation, such as a Laplacian operation or a Sobel operation, is performed on the grayscale UI 101 to create an edge detection on the grayscale UI 101. Edge detection operations are generally premised on the fact that pixel intensity shows a high variation of intensity at an edge area. The process can be customized, but the edge detection for the display is generally identified by recognizing an intensity threshold to determine the edge. Typically, the threshold is set between about 2 and 82. The edge detection grayscale UI 101 is processed next to find the contours of interest, or regions of interest, which will be explained below. In one example, the contour of interest would be identifying the boundary of a non-alpha-numeric artifact in the Laplacian grayscale UI 101. An artifact, as explained above, may be a grouping of alpha-numeric text, a radio button, a check box, a data entry field, a label (which is typically a grouping of alpha-numeric text), etc. Here, the processor is looking for non-alpha-numeric artifacts. The contour, as generally used herein, means the perimeter of the non-alpha-numeric artifact of interest. The contour of the various artifacts may be identified by known algorithms in the industry and/or through a call function to the OpenCV library that applies those algorithms, to identify artifacts in the user interface by recognized shapes. While generally described herein based on a 2-dimensional display for the user interface, the perimeters may be 3-dimensional (such as virtual reality or holographic imaging), or even more dimensions (although it is difficult to visualize additional dimensions). In one exemplary embodiment, the perimeter may include a durational component, a.k.a. a sequential or chronological dimension.

For each contour of interest, or region of interest, in the Laplacian grayscale UI 101, the operation includes finding the boundary of the region of interest. In sum, the contour of interest is surrounded by a boundary or perimeter. The boundary is next examined to determine whether the boundary is a rectangle or other shape. If the boundary is a rectangle, the boundary is further examined to determine whether the boundary is a square or a rectangle. If the boundary is determined to be a square, the boundary is saved to the square boundary list (e.g., this artifact has a square boundary although the type of artifact has not yet been identified). If the boundary is determined to be a rectangle, the boundary is saved to the rectangle boundary list. If the boundary is not determined to be a rectangle, the boundary is examined to determine if the boundary is circular. If the boundary is determined to be circular, the boundary is saved to the circular boundary list. Notice, while the exemplary embodiment relates to rectangles (and squares) as well as circles, other geometries are possible such as oval, elliptical, triangular, hexagonal, and irregular shapes. Many identified contours may be discarded as not relevant to the search parameters. In certain instances, based on thresholds for the contour dimensions and the like, duplicate boundaries are deleted from the list. The review may produce boundaries that are not rectangular or circular. These boundaries may be used to customize searches for particular or unusual artifacts. As stated above, the rectangular, square, circular, or other shape described is 2-dimensional, but could be 3 or more-dimensional rendition in a computer-generated display. Thus, a square may be a cube, a circle may be a sphere or cylinder, a rectangle may be a cuboid or the like, etc.

FIG. 2 shows the Laplacian grayscale UI 101 where the processor has added boundaries 202, to the non-alpha-numeric artifacts. The boundaries 202 are established around each radio button. The boundaries 204 are established around other artifacts located on Laplacian grayscale UI 101, but are distinguished from the radio button boundaries because the example provided herein is to find radio buttons. The search for other boundaries or artifacts would be similar, however. For example, one boundary 204 is around the dialog box title—New Shortcut. Other boundaries 204 identify the clickable icons labeled "Bypass Wizard", "<Back", ">Next", ">>Finish", and "XCancel". Other user interfaces would have other boundaries although the presently indicated boundaries are a sufficient exemplary outline of the technology for understanding the boundary process.

Once the boundaries of the non-alpha-numeric artifacts are established, the process continues by looking for a particular type of boundary. For example, radio buttons would be defined by circular boundaries saved to the circular boundary list. Notice, the boundaries on the figures are for convenience and representation, which do not necessarily match the actual boundaries/contours discovered by the process. Check boxes would be defined by square boundaries (typically) saved to the square boundary list, in certain instances, check boxes could be rectangular or circular. Data entry fields would be defined by square or rectangular boundaries saved to the square and rectangular boundaries list. Other non-alpha-numeric artifacts would have similarly known or established shapes. In this exemplary case, the second, separate application B is looking for a radio button such that it retrieves or identifies the circular boundaries as potential radio buttons. The geometric of the non-alpha-numeric artifact may be customizable by the user programming the script or code for second, separate application B in certain embodiments.

Figure 3:
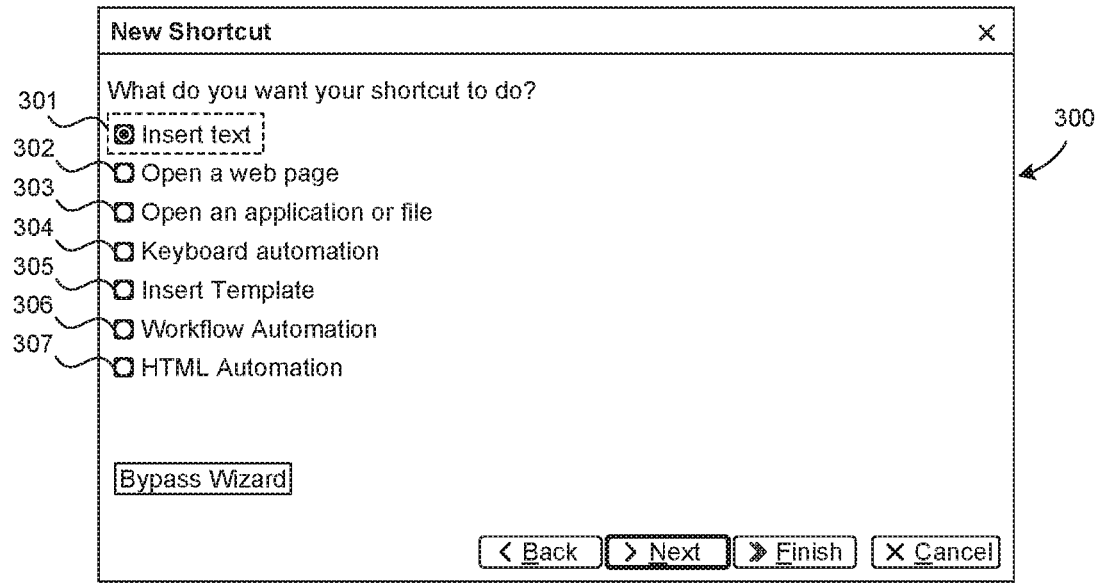
FIG. 3 is a modified version of the interface display of FIG. 2 consistent with the technology of the present application where particular non-alpha-numeric artifacts have been identified.

In certain aspects, the processor determines a "radio button" from other circular boundaries by examining the circular contours of the boundary and the shape of the non-alpha-numeric artifact within the circular boundary. In other words, the processor would review all the circular boundaries saved to the circular boundary list to determine if the boundary further has a circularly shaped artifact within the boundary. A radio button may be determined by confirming the circular boundary contains a concentric circle within the circular boundary for example. Finding circular boundaries with concentric circles results in the generation of a radio button boundary list, which are the candidate artifacts to be radio buttons, which is shown by boundary processed modified UI 300 in FIG. 3. The radio button candidate boundaries 301, 302, 303, 304, 305, 306, 307 are highlighted on UI 300 showing seven (7) candidate radio buttons 301-307 in this instance. The boundary processed modified UI 300 is saved and used further as explained below. For other non-alpha-numeric artifacts, the processor would look for similar relationships. For example, a check box determination may look for a square within a square boundary. In certain embodiments, the geometric relationship between the artifact and the boundary may be customizable by the user programming the script or code.

Although the process has identified seven (7) candidate radio buttons, the second, separate application B at this point has no knowledge of any labels linked to the radio buttons. Thus, the second, separate application B begins a process of linking labels to the radio buttons. Label artifacts are typically alpha-numeric artifacts (as opposed to non-alpha-numeric artifacts).

Figure 4:
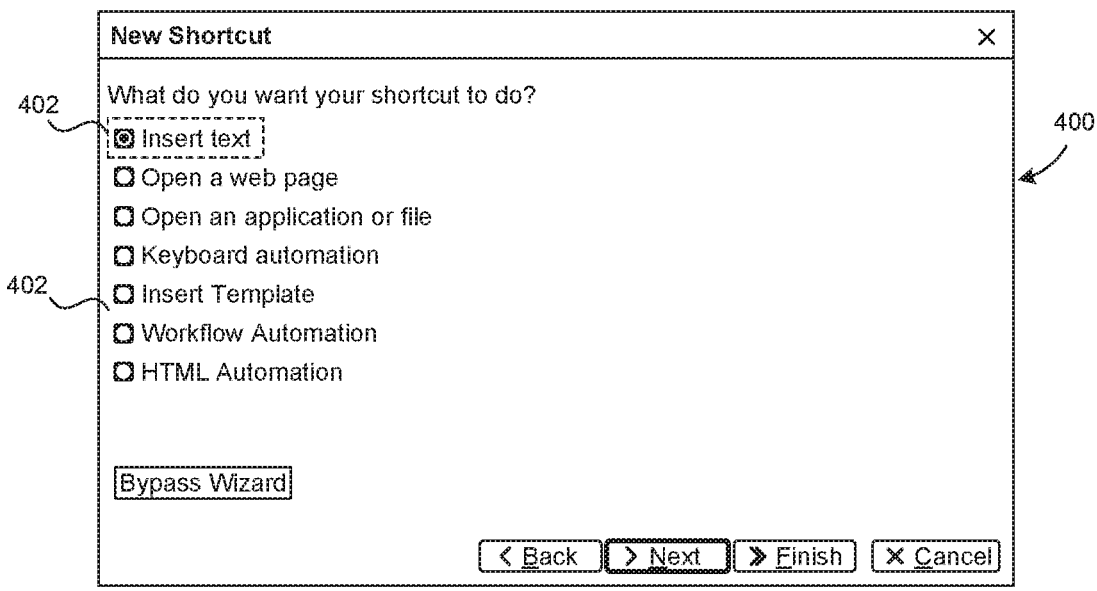
FIG. 4 is a modified version of the interface display of FIG. 1 consistent with the technology of the present application where alpha-numeric artifacts in the interface display have been identified.
Figure 5:
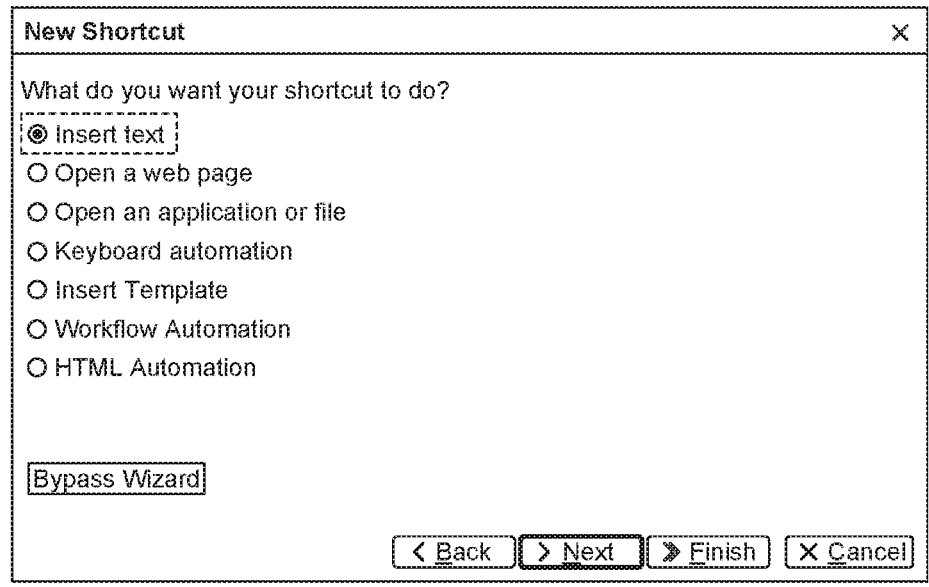
FIG. 5 is a cleaned version of the modified version of the interface display of FIG. 4 consistent with the technology of the present application.

The second, separate application B uses the grayscale version of UI 100 to next identify areas on UI 100 that have alpha-numeric artifacts by first applying a morphological gradient filter to the grayscale version of UI 100 to locate alpha-numeric artifact candidates. The grayscale UI 100 also is converted to black and white, typically with a 50% conversion threshold. In other words, if the grayscale pixel is closer to black than white, it is converted to black and if grayscale pixel is closer to white than black, it is converted to white. This is an optional step that facilitates the processing for linking alpha-numeric artifacts with non-alpha-numeric artifacts (e.g. linking the labels to the radio buttons). For grayscale pixels equidistant from black and white, the pixel conversion can be either black or white by design. The conversion to black and white may be considered binarization of the user interface. The morphological gradient filter UI 400 is shown in FIG. 4. As can be appreciated, the morphological gradient filter UI 400 may have errors, such as 402, which are typically long or short lines. Long/short lines are lines statistically determined to be either too long or too short to be associated with an alpha-numeric symbol. Alternatively, the length of a line above or below a threshold may be removed as unlikely to be associated with an alpha-numeric character. For example, a threshold may be set such that a line over thirty pixels long may be removed. Removing the errors 402 provides a clean morphological gradient filter UI 404 as shown in FIG. 5.

Figure 6:
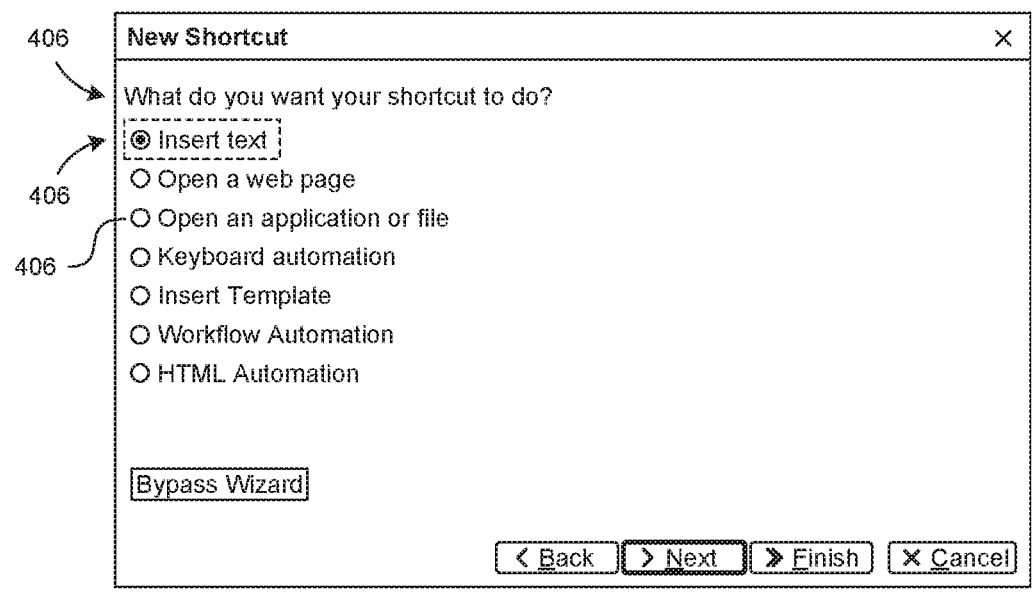
FIG. 6 is a version of the modified version of the interface display of FIG. 1 identifying associated alpha-numeric regions.
Figure 7:
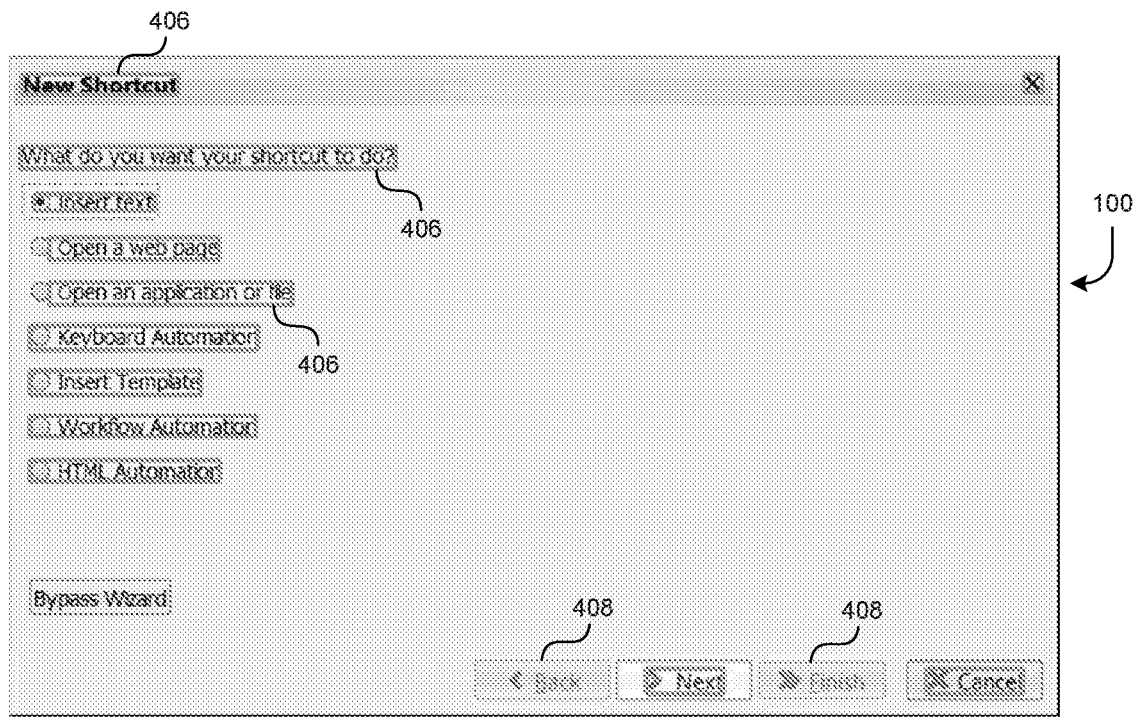
FIG. 7 shows the interface display of FIG. 1 with the potential alpha-numeric artifact regions identified consistent with the technology of the present application.

The second, separate application B next connects the alpha-numeric artifacts that are horizontally and spatially aligned using a morphological-gradient filter to generate horizontally and spatially aligned alpha-numeric regions 406 as shown in FIG. 6. FIG. 6 shows the candidate alpha-numeric regions 406. To confirm each candidate contains alpha-numeric information, the second, separate application B reviews each region 406 to determine whether the non-zero pixels in the region are more likely than not text by comparing the potential text pixels to a threshold. In one particular example, the bounded area may be examined to determine if a certain percentage of pixels are the text color, such as black or white. In other words, if 45% or more of the pixels in the identified field are the text color or text shade, the bounded area is identified as a candidate text field. The threshold may range from as low as about 35% to as high as about 75%. It has been found that setting the threshold between about 40% and 55% works well for most applications. For clarity, FIG. 7 shows original UI 100 with the alpha-numeric regions 406 boxed after the area is confirmed to likely have alpha-numeric information. As best seen in FIG. 7, some text regions 408 were not identified as an alpha-numeric region. These areas were faded or less dark text areas such that the threshold requirements were not satisfied.

Figure 8:
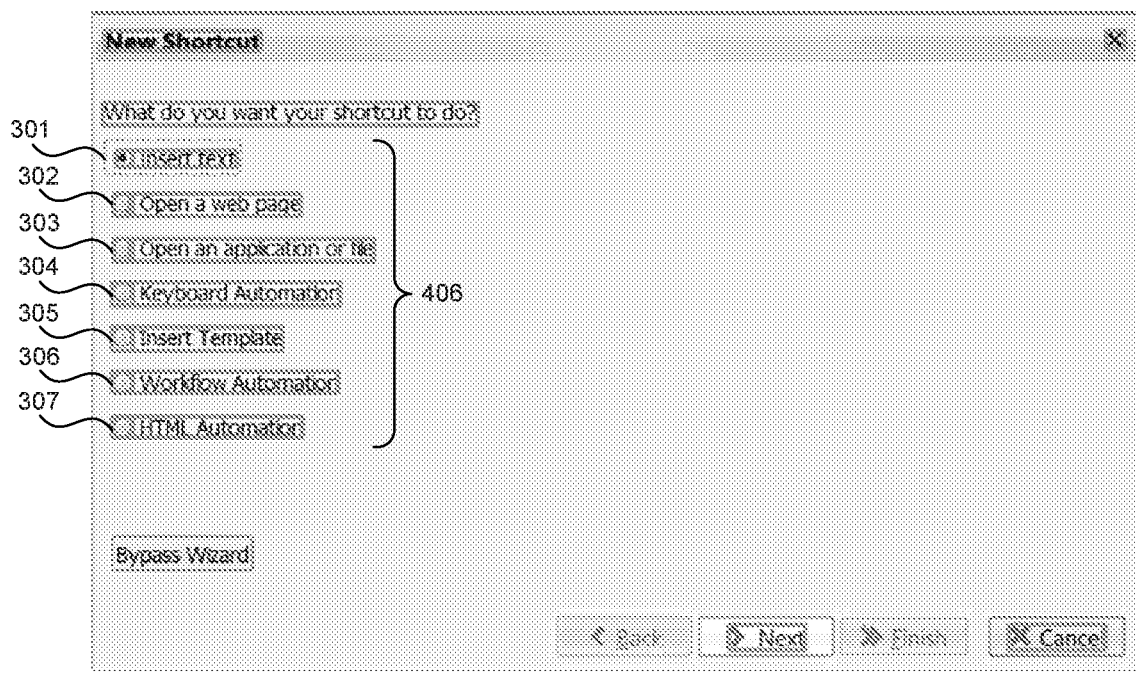
FIG. 8 shows the interface display of FIG. 1 with the potential non-alpha-numeric artifacts linked to the potential alpha-numeric artifact regions consistent with the technology of the present application.

The second, separate application B merges the radio button candidates 301-307 (or generically non-alpha-numeric artifact candidates) and the candidate alpha-numeric regions 406. The radio button candidates 301-307 and candidate alpha-numeric regions 406 are examined to determine whether any non-alpha-numeric artifacts are in an alpha-numeric region, which may be possible if, for example, a text "O" is misidentified as a candidate radio button. Next, a spatial analysis links the radio button candidates 301-307 to the candidate alpha-numeric regions 406 as shown in FIG. 8. Generally, labels for artifacts are determined by a proximity analysis although other spatial analysis may be used. The spatial analysis generally links the non-alpha-numeric artifact to the alpha-numeric artifact by identifying the horizontal relationship between the various candidates with the closest pairing matched or linked. The spatial analysis, which may be a linear distance analysis, may be customized by the user programming the script or code for the processor to execute. Generally, in the US, non-alpha-numeric artifacts and the associated labels (or alpha-numeric artifacts) are aligned horizontally or vertically such that a linear distance type of spatial analysis is satisfactory. However, linking or search parameters may be customized for unique UIs. Also, in certain instances, the relationships may be overridden by an end user.

Although candidate radio buttons have been identified and candidate alpha-numeric regions have been identified and linked to the candidate radio buttons, the second, separate application B has no knowledge of the alpha-numeric text in the candidate alpha-numeric regions. Thus, the process next needs to identify the alpha-numeric information in the candidate alpha-numeric regions.

Figure 9:
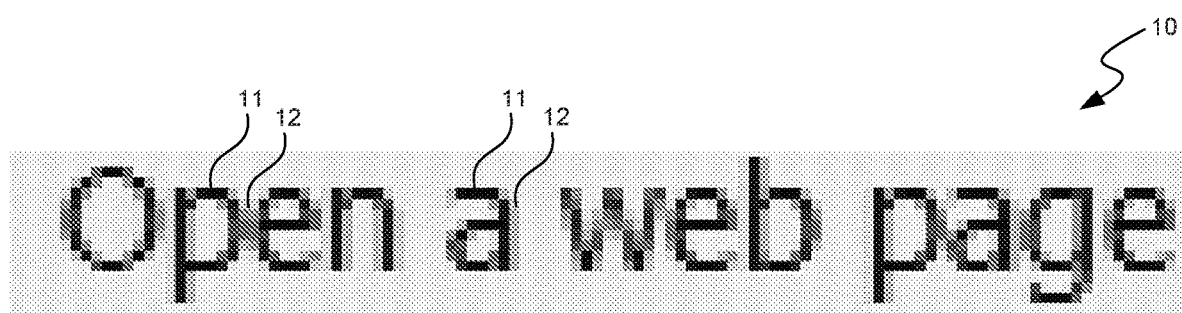
FIG. 9 shows alpha-numeric data displayed in a potential alpha-numeric region artifact consistent with the technology of the present application.

Moreover, as mentioned above, the graphical displays of UIs are designed to be read by people. The displayed alpha-numeric information is processed using conventional anti-aliasing technologies to make the display artifacts more palatable for people. While palatable for people reading the information, UI displays are difficult for a computer to decipher. For example, FIG. 9 shows a text box in a UI display, although scaled to about 4× a typical display. The text box contains characters 10 that recite "Open a web page". The anti-aliasing processing provided to make the characters, or other alpha-numeric information, more palatable for people by smoothing jagged edges on curved lines and diagonals, which includes, among other things, shading and shadowing around the characters. The anti-aliasing diminishes the stairstep-like lines resulting from the pixelated nature of the computer displays by surrounding the stairsteps of each primary character pixel 11 with intermediate shadow pixels 12, which is shown as gray for this greyscale image, but could be color for color images. Generally, the intermediate shadow pixels 12 blend between the primary character pixel 11 and the background. As can be seen, the characters 10 include both the primary character pixel 11 and the intermediate shadow pixels 12. The blending of the primary character pixel 11 and the intermediate shadow pixels 12 make it difficult, if not impossible, for optical character recognition engines, such as, for example, the Tesseract optical character recognition (OCR) library to determine the correct character.

Figure 10:
FIG. 10 shows alpha-numeric data modified to filter anti-aliasing of the alpha-numeric data consistent with the technology of the present application.

The alpha-numeric display characters 10 are preprocessed to facilitate OCR determination of the characters 10. The preprocessing may be a single pass filter or a multi-pass filter, but generally eliminates the shadow pixels 12 from the primary character pixels 11 to make characters 13, which are essentially reproductions of the primary character pixels 11. In certain embodiments, the filtering may be a histogram filtering to enhance the contrast between alpha-numeric images and non-alpha-numeric portions of the field. For a grayscale image, the filtering is any pixel, primary character pixels 11 or shadow pixels 12, with a grayscale closer to background than to the pixel shade (pixel shade is typically the opposite of the background shade), the pixel is changed to background and any pixel closer to the pixel shade than background is retained at its present value/shade (or alternatively changed to the text pixel shade (or hue)). Notice that, if the grayscale shade is equidistant between the background and text shade, the pixel may be changed to background or retained as a matter of design choice. The above example presumes the threshold cutoff for conversion of a pixel to background is at the midpoint between background and pixel shade. The threshold may be closer or further as a matter of design choice. In certain embodiments, for example, the pixel may be converted to a background shade if the pixel shade is within 30% of the background shade. In other embodiments, the pixel may be converted to a background shade if the pixel shade is within 72% of the background shade, etc. Selecting a threshold value such that pixels at slightly closer to background in shade, intensity, or hue, are actually considered text results in overall better performance. Thus, the threshold is typically set between about 40 to just below 50% between background and foreground where shades in the 0-threshold level are considered background and shades in the threshold to 100% are considered foreground. Moreover, multiple filtering steps may be provided. For example, a first pass may convert shadow pixels 12 to a background shade where the shade of the shadow pixel is within 40% of the background shade. A second pass may convert shadow pixels 12 to a background shade where the shade of the shadow pixel is within 55% of the background shade. Thus, the threshold value may be increased (or decreased) for multiple passes. After the last pass (or only pass), the remaining pixels are converted to the pixel shade (for black text on a white background, the pixels are converted to black, and for white text on a black background, the pixels are converted to white). The filtered display is shown in FIG. 10. FIG. 10 displays characters 13 that recite "Open a web page". The characters 13 contain primary text pixels 11 and a few error pixels 14, which are shadow pixels 12 where the greyscale value was sufficient to withstand the filtering. For example, the space between the right most arc of the "p" and the left most generally vertical line of the "e" in the original image produced a relatively dark shadow pixel 12 that was converted into the characters 13 as an error pixel.

FIG. 10 is again shown at about 4× a scale. The characters 13 can now be imaged and processed by a conventional optical character recognition method such that a processor can recognize the display artifact character without a priori knowledge of the characters and/or an API from the application causing the display.

Generally, scaling the display by about 4× has been shown as sufficient to preprocess (or filter) characters 10 of the display to produce characters 13 for OCR. However, certain displays may require more or less of a scale. While the process can work without increasing the resolution scale of the display, the OCR process to identify alpha-numeric data in a display works with increased confidence when the display is scaled to at least 2× the display resolution; the maximum may be 5×, 6×, or more with about 15× being the practical upper limit for most displays. Additionally, the threshold shade is typically set at just greater (or just less) than about 50%, although slightly better results are achieved for thresholds set just less than 50%. Moreover, the scale resolution and thresholds may be customized for each display.

After completing OCR on the label candidates using the alpha-numeric candidate regions, the find-a-radio-button function can search its list of text strings to determine whether any string on the list matches the sought label text, which in this exemplary embodiment is "Open a web page". For each saved text string, it scores a comparison of the saved string with the label string. The best score or closest score is determined to be the match, although a minimum confidence value may be established such that a clearly incorrect label is not considered. If the alpha-numeric region having "Open a web page" is located, the link radio button is examined for the desired action, which is select the open a web page radio button in this case.

The find-a-radio-button function of the second, separate application B has now identified on the UI 100 from first application A a likely radio button with a label that likely matches the sought label, so it calculates the radio button and label coordinates (top left corner x and y values, height and width) with respect to the starting image to enable second, separate application B, or a high-level script, to find the radio button. The function must also determine the radio button status.

To determine the status (selected or not selected) of the radio button, the find-a-radio-button function converts UI 100 of first application to a grayscale and remaps the radio-button image to the polar coordinates space. Next, the second, separate application determines background and foreground, and performs calculations to determine whether there is a center component that can be distinguished from its surrounding area, which may be calculated or discrete calls to the OpenCV library. Differentiating the radio button and other areas allows for developing a conclusion as to whether the radio button fact selected already.

The find-a-radio-button function finishes its work by returning the status of the radio button and its coordinates to the second, separate application B, typically using a high-level script, to complete the action. The returned coordinates, of course, define the bounding rectangle of the radio button with respect to the application window in which it's used. Determining the bounding rectangles, or regions, for objects of interest means we know their positions, which, in this example, allows us to determine the coordinates of a point inside the active area of the radio button and then use an operating-system (OS) function to click the mouse at that location to complete the automation. In this case, the shortcut selects the radio button labelled "Open a web page".

As can be appreciated, the above is but one exemplary function applicable by second, separate application B. In certain instances, several scripts can be linked to accomplish routine functions of transferring or accessing information by second, separate application B from the display of a first application A without a priori knowledge of first application A and without an API to first application A. For example, continuing the example above, a next script could be developed to locate a data entry field for a URL using similar tools to the above. The script could indicate to copy the URL from the data entry field and insert the URL to the web page opened by selecting the "Open a web page" radio button. Next, a script could next be directed to find data/information in the web page to which the processor is directed.

As described above, certain artifacts whether alpha-numeric or non-alpha-numeric artifacts may be identified and linked by a geometric analysis. Multiple dimensional analyses are possible as mentioned as the user interface may have multiple dimensions. If duration, sequence, or time is considered a dimension, such as it is herein, another geometric analysis may include a sequential or chronological analysis. For example, in certain uses, the separate application B may be instructed to identify a data entry field that is labeled customer account. The separate application B may be further instructed to copy the customer account data once the field is updated with the data to a customer call log. Separate application B may identify the data field artifact with the label as indicated above. The separate application B provides a script to monitor the data field over a period of time for a change in the state of the data field, which would likely be alpha-numeric information in this example, but could be about any type of data. A change of state is referenced rather than a change in the specific data as the separate application B may, in certain exemplary embodiments, have knowledge of the actual data but rather just that the state of the data contained therein has changed (a delta of some type). Once the change has been identified, the separate application B would take some action based on the change in state of the artifact. In this exemplary embodiment, application B may copy the customer number to the customer call log, etc. A change in state of the artifact may be useful in identifying a change in textual information, status of a button or check box, movement in a video or animation, change in sound for audio, and the like.

Once the state of the artifact begins changing, it may take time for the artifact to reach another stable state. For example, it may take a moment for a video to move an object from a top right position to a bottom left position, it may take a moment to completely enter text information to a data entry field, etc. In certain instances, the separate application may provide a data entry time period after which the data is considered updated. Alternatively, the separate application may monitor the artifact undergoing a state change every few moments of time (which may be micro seconds, seconds, minutes, pico seconds, or the like). If the state of the artifact remains constant for one (1), two (2), or more periods, the application may determine that the artifact has reached another steady state, at which point the application may take some action based on the steady state. In this example, a customer account number, such as, JoeS12345, is being entered in the artifact. The separate application B identifies the change of data once the "J" in the account number is input to the artifact. The separate application B continues to monitor the artifact every period of time for additional change. For example, the next pull from the data field indicates the data is "JoeS1". As the data changed from the first pull to the second pull, separate application B determines data is still being entered to the field. At the next pull from the data field, the data is "JoeS12345. Again, separate application B detects a data change from the previous pull of the information and determines data may still be being entered to the field. At the next pull, separate application B detects the data is JoeS12345, which is the same as the previous pull of the data. Separate application B may determine based on this information that the data is now complete, at which point the geometric analysis (chronological analysis) is finished. In practice, the data may need to be the same for multiple checks prior to confirming the data is stable over time.

Figure 11:
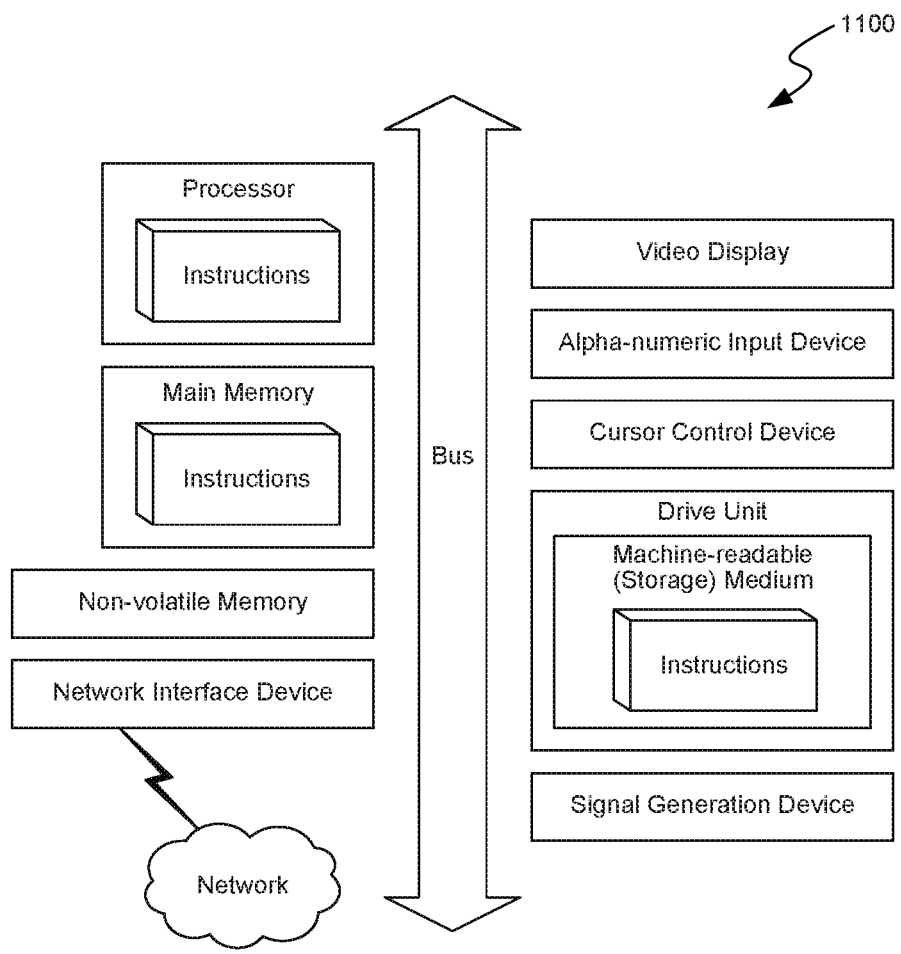
FIG. 11 is an exemplary machine consistent with the technology of the present application.

The technology described herein optionally comprises many networked machines. FIG. 11 depicts a diagrammatic representation of a machine, in the example form, of a computer system within which a set of instructions, for causing the machine to perform any one or more of the methodologies discussed herein, may be executed.

In the example of FIG. 11, the computer system 1100 includes a processor, memory, non-volatile memory, and an interface device. Various common components (e.g., cache memory) are omitted for illustrative simplicity. The computer system 1100 is intended to illustrate a hardware device on which any of the functions, applications, engines, and scripts are running as described herein and shown in figures (and any other components described in this specification) can be implemented. The computer system 1100 can be of any applicable known or convenient type. The components of the computer system 1100 can be coupled together via a bus or through some other known or convenient device.

The processor may be, for example, a conventional microprocessor such as an Intel microprocessor, Motorola microprocessor, or the like. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1100. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium". A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted reside in the interface.

In operation, the computer system 1100 can be controlled by operating system software that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some examples of the technology of the present application include:

1. A method of recognizing a non-alpha-numeric artifact on a digitized display comprising,
    defining a perimeter of a region on a digitized display for a processor;
    identifying, by the processor, a boundary of at least one non-alpha-numeric artifact within the region on the digitized display;
    determining, by the processor, a shape of the boundary of the at least one non-alpha-numeric artifact;
    comparing, by the processor, the shape of the boundary of the at least one non-alpha-numeric artifact to a target shape and save the boundary to a potential candidate artifact list;
    determine, by the processor, whether the at least one non-alpha-numeric artifact shape has a geometric relationship to the shape of the boundary of the potential candidate artifact list and, if the at least one non-alpha-numeric artifact shape is determined to have the geometric relationship, maintain the boundary on the potential candidate artifact list and, if the at least one non-alpha-numeric artifact shape is determined to not have the geometric relationship, remove the boundary from the potential candidate artifact list;
    linking, by the processor, an alpha-numeric artifact to each of the potential candidate artifact list; and
    recognizing, by the processor, the alpha-numeric artifact linked to the potential candidate artifact link, wherein the at least one non-alpha-numeric artifact is recognized.
2. The method of example 1 wherein the recognized at least one artifact is a radio button having the label.
3. The method of example 2 further comprising activating the radio button.
4. The method of example 1 wherein the recognized at least one artifact is a check box having the label.
5. The method of example 4 further comprising checking the check box.
6. The method of example 1 wherein the recognized at least one artifact is a data entry field with the label.

7. The method of example 6 further comprising entering data in the data entry field.
8. The method of example 6 further comprising copying data from the data entry field.
9. The method of example 1 wherein the recognized at least one artifact is a button with a label.
10. The method of example 9 further comprising clicking on the button
11. The method of example 1 wherein the recognized at least one artifact is a menu with a list of labels
12. The method of example 11 further comprising clicking on the menu and selecting an item in the menu list
13. The method of example 1 wherein the step of recognizing, by the processor, the label comprises preprocessing the label to remove anti-aliasing.
14. A method of recognizing alpha-numeric artifacts on a digitized display comprising:
    identifying, by a processor, at least one candidate region on the digitized display as having alpha-numeric artifacts;
    processing the at least one candidate region on the digitized display to enhance the boundaries of the alpha-numeric artifacts, wherein the processing comprises scaling the at least one candidate region and removing anti-aliasing from the alpha-numeric; and recognize the non-anti-aliased alpha-numeric artifacts to recognize at least one alpha-numeric character.
15. The method of example 14 wherein the step of recognizing the non-anti-aliased alpha-numeric artifacts comprises optical character recognition.
16. The method of example 14 further comprising the step of copying the recognized at least one alpha-numeric character.
17. The method of example 14 further comprising the step of further processing the at least one recognized alpha-numeric character.
18. The method of example 16 further comprising the step of placing the copied recognized at least one alpha-numeric character in a data field of another artifact.
19. A method performed on at least one processor of identifying data in an artifact in a digital display, the method comprising:
    identifying an artifact associated with a digital display;
    determining an initial state of the identified artifact at a beginning of a period of time, where the initial state of the identified artifact comprises initial data;
    monitoring the identified artifact for the period of time;
    determining over the period of time whether the initial state of the identified artifact changes;
    if it is determined that the initial state of the identified artifact has changed, identifying a steady state subsequent to the change, wherein the steady state of the identified artifact comprises changed data;
    if it is determined that the initial state of the identified artifact has not changed, continue to monitor the identified artifact for the period of time; and
    processing the changed data.
20. The method of example 19 wherein the changed data is different than the initial data.
21. The method of example 19 wherein the changed data is the same as the initial data.
22. The method of example 19 wherein processing the data comprises copying the changed data.
23. The method of example 19 wherein the artifact comprises an artifact selected from a group of artifacts consisting of: a radio button, a data entry field, a character, a check box, list of items, a scrolling menu, an audio, or a combination thereof.
24. The method of example 19 wherein the step of identifying the steady state comprises:
    sampling a state of the identified artifact during the period of time to obtain a sample state of the identified artifact;
    comparing the sample state of the identified artifact to an existing previous sample state of the identified artifact;
    if the sample state of the identified artifact is the same as the existing previous sample state, identify the sample state as the steady state; and
    if the sample state of the identified artifact is not the same as the existing previous sample state, replace the existing previous sample state with the sample state and repeat the sampling and comparing steps until the sample state is the same as the existing previous sample state.
25. The method of example 24 wherein the existing previous sample state is a null state.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may, thus, be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually affect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the disclosure.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A method of recognizing alpha-numeric artifacts within a window displayed on a digitized display by a first application executing on at least one processor, the method comprising:
   identifying, by a second application executing on the at least one processor, pixel coordinates for a scope of the window displayed by the first application, wherein the second application does not have access to an application programming interface (API) to access data of the first application;
   identifying, by the second application, at least one candidate region on the digitized display of the first application as having alpha-numeric artifacts;
   processing, by the second application, the at least one candidate region on the digitized display of the first application to enhance boundaries of the alpha-numeric artifacts,
      wherein the processing comprises scaling the at least one candidate region and removing anti-aliasing from the alpha-numeric artifacts; and
   recognizing, by the second application, non-anti-aliased alpha-numeric artifacts to recognize at least one alpha-numeric character on the digitized display of the first application.

2. The method of claim 1 wherein the step of recognizing the non-anti-aliased alpha-numeric artifacts comprises optical character recognition.

3. The method of claim 1 further comprising the step of copying the recognized at least one alpha-numeric character.

4. The method of claim 1 further comprising the step of further processing the at least one recognized alpha-numeric character.

5. The method of claim 3 further comprising the step of placing the copied recognized at least one alpha-numeric character in a data field of another artifact.

6. The method of claim 1 further comprising the step of linking the alpha-numeric artifacts with non-alpha-numeric artifacts.

7. The method of claim 1 further comprising the step of determining at least one non-alpha-numeric artifact is in the at least one candidate region.

8. A non-transitory computer-readable medium storing instructions that, when executed by a computing system, cause the computing system to perform operations of recognizing alpha-numeric artifacts within a window displayed on a digitized display by a first application executing on at least one processor, the operations comprising:
   identifying, by a second application executing on the at least one processor, pixel coordinates for a scope of the window displayed by the first application, wherein the second application does not have access to an application programming interface (API) to access data of the first application;
   identifying, by the second application, at least one candidate region on the digitized display of the first application as having alpha-numeric artifacts;
   processing, by the second application, the at least one candidate region on the digitized display of the first application to enhance boundaries of the alpha-numeric artifacts,
      wherein the processing comprises scaling the at least one candidate region and removing anti-aliasing from the alpha-numeric artifacts; and
   recognizing, by the second application, non-anti-aliased alpha-numeric artifacts to recognize at least one alpha-numeric character on the digitized display of the first application.

9. The non-transitory computer-readable medium of claim 8, wherein the operations further comprise:
   recognizing the non-anti-aliased alpha-numeric artifacts comprises optical character recognition.

10. The non-transitory computer-readable medium of claim 8, wherein the operations further comprise:
    copying the recognized at least one alpha-numeric character.

11. The non-transitory computer-readable medium of claim 8, wherein the operations further comprise:
    processing the at least one recognized alpha-numeric character.

12. The non-transitory computer-readable medium of claim 10, wherein the operations further comprise:
    placing the copied recognized at least one alpha-numeric character in a data field of another artifact.

13. The non-transitory computer-readable medium of claim 8, wherein the operations further comprise:
    linking the alpha-numeric artifacts with non-alpha-numeric artifacts.

14. The non-transitory computer-readable medium of claim 8, wherein the operations further comprise:
    determining at least one non-alpha-numeric artifact is in the at least one candidate region.

15. A system comprising:
    one or more processors; and
    one or more memories storing instructions that, when executed by the one or more processors, cause the system to perform a process of recognizing alpha-numeric artifacts within a window displayed on a digitized display by a first application executing on the one or more processors, the process comprising:

identifying, by a second application executing on the one or more processors, pixel coordinates for a scope of the window displayed by the first application, wherein the second application does not have access to an application programming interface (API) to access data of the first application;

identifying, by the second application, at least one candidate region on the digitized display of the first application as having alpha-numeric artifacts;

processing, by the second application, the at least one candidate region on the digitized display of the first application to enhance boundaries of the alpha-numeric artifacts, wherein the processing comprises scaling the at least one candidate region and removing anti-aliasing from the alpha-numeric artifacts; and recognizing, by the second application, non-anti-aliased alpha-numeric artifacts to recognize at least one alpha-numeric character on the digitized display of the first application.

16. The system according to claim 15, wherein the process further comprises:

recognizing the non-anti-aliased alpha-numeric artifacts comprises optical character recognition.

17. The system according to claim 15, wherein the process further comprises:

copying the recognized at least one alpha-numeric character.

18. The system according to claim 15, wherein the process further comprises:

processing the at least one recognized alpha-numeric character.

19. The system according to claim 17, wherein the process further comprises:

placing the copied recognized at least one alpha-numeric character in a data field of another artifact.

20. The system according to claim 15, wherein the process further comprises:

linking the alpha-numeric artifacts with non-alpha-numeric artifacts.

* * * * *